(12) United States Patent
Nemirovsky et al.

(10) Patent No.: US 7,636,836 B2
(45) Date of Patent: Dec. 22, 2009

(54) FETCH AND DISPATCH DISASSOCIATION APPARATUS FOR MULTISTREAMING PROCESSORS

(75) Inventors: Mario D. Nemirovsky, Saratoga, CA (US); Adolfo M. Nemirovsky, San Jose, CA (US); Narendra Sankar, Campbell, CA (US); Enrique Musoll, San Jose, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 0 days.

(21) Appl. No.: 12/173,560

(22) Filed: Jul. 15, 2008

(65) Prior Publication Data
US 2008/0270757 A1    Oct. 30, 2008

Related U.S. Application Data

(63) Continuation of application No. 11/539,322, filed on Oct. 6, 2006, now Pat. No. 7,406,586, which is a continuation of application No. 09/706,154, filed on Nov. 3, 2000, now Pat. No. 7,139,898.

(51) Int. Cl.
*G06F 9/24* (2006.01)
(52) U.S. Cl. ........................... 712/215; 712/205
(58) Field of Classification Search ............ 712/215
See application file for complete search history.

(56) References Cited

U.S. PATENT DOCUMENTS

| | | | |
|---|---|---|---|
| 3,771,138 A | 11/1973 | Celtruda et al. | |
| 4,916,652 A | 4/1990 | Schwarz et al. | |
| 4,924,376 A | * | 5/1990 | Ooi ........................... 712/207 |
| 5,313,600 A | * | 5/1994 | Kasai ......................... 712/207 |
| 5,404,469 A | 4/1995 | Chung et al. | |
| 5,430,851 A | 7/1995 | Hirata et al. | |
| 5,574,939 A | 11/1996 | Keckler et al. | |
| 5,604,909 A | 2/1997 | Joshi et al. | |
| 5,699,537 A | 12/1997 | Sharangpani et al. | |
| 5,724,565 A | 3/1998 | Dubey et al. | |

(Continued)

OTHER PUBLICATIONS

Hirata, H. etal., An Elementary Processor Architecture with Simultaneous Instruction Issuing from Multiple Threads, 1992, ACM pp. 136-145.*

(Continued)

*Primary Examiner*—Eric Coleman
(74) *Attorney, Agent, or Firm*—Sterne, Kessler, Goldstein & Fox P.L.L.C.

(57) ABSTRACT

A dynamic multistreaming processor has instruction queues, each instruction queue corresponding to an instruction stream, and execution units. The dynamic multistreaming processor also has a dispatch stage to select at least one instruction from one of the instruction queues and to dispatch the selected at least one instruction to one of the execution units. Lastly the dynamic multistreaming processor has a queue counter, associated with each instruction queue, for indicating the number of instructions in each queue, and a fetch counter, associated with each instruction queue, for indicating an address from which to obtain instructions when the associated instruction queue is not full. The dynamic multistreaming processor might also have fetch counters for indicating a next instruction address from which to obtain at least one instruction when the associated instruction queue is not full. The dynamic multistreaming processor could also have a second counter for indicating a next instruction address.

16 Claims, 3 Drawing Sheets

U.S. PATENT DOCUMENTS

| | | | |
|---|---|---|---|
| 5,742,782 | A | 4/1998 | Ito et al. |
| 5,745,725 | A | 4/1998 | Simpson |
| 5,745,778 | A | 4/1998 | Alfieri |
| 5,812,811 | A | 9/1998 | Dubey et al. |
| 5,848,268 | A * | 12/1998 | Matsuo ................ 712/233 |
| 5,900,025 | A | 5/1999 | Sollars |
| 5,907,702 | A * | 5/1999 | Flynn et al. ............ 718/108 |
| 5,913,049 | A | 6/1999 | Shiell et al. |
| 5,933,627 | A | 8/1999 | Parady |
| 6,092,175 | A | 7/2000 | Levy et al. |
| 6,105,053 | A | 8/2000 | Kimmel et al. |
| 6,105,127 | A | 8/2000 | Kimura et al. |
| 6,141,746 | A | 10/2000 | Kawano et al. |
| 6,219,780 | B1 | 4/2001 | Lipasti |
| 6,343,348 | B1 | 1/2002 | Tremblay et al. |
| 6,378,063 | B2 | 4/2002 | Corwin et al. |
| 6,460,130 | B1 * | 10/2002 | Trull et al. ............. 712/32 |
| 6,470,443 | B1 | 10/2002 | Emer et al. |
| 6,530,042 | B1 * | 3/2003 | Davidson et al. ......... 714/47 |
| 6,542,987 | B1 * | 4/2003 | Fischer et al. .......... 712/217 |
| 6,542,991 | B1 | 4/2003 | Joy et al. |
| 6,622,240 | B1 | 9/2003 | Olson et al. |
| 6,691,221 | B2 * | 2/2004 | Joshi et al. ............ 712/215 |
| 6,968,444 | B1 | 11/2005 | Kroesche et al. |
| 7,035,998 | B1 | 4/2006 | Nemirovsky et al. |
| 7,046,677 | B2 | 5/2006 | Monta et al. |
| 7,139,898 | B1 | 11/2006 | Nemirovsky et al. |
| 7,406,586 | B2 | 7/2008 | Nemirovsky et al. |

OTHER PUBLICATIONS

Diefendorff, Keith. "WinChip4 Thumbs Nose at ILP." Microprocessor Report, http://www.mdronline.com/mpr/h/19981207/121605.html, Dec. 7, 1998.

Diefendorff, Keith. "Compaq Chooses SMT for Alpha." Microprocessor Report, http://www.mdronline.com/mpr/h/19991206/1131601.html Dec. 6, 1999.

Diefendorff, Keith. "Jalapeno Powers Cyrix's M3." Microprocessor Report. http://www.mdronline.com/mpr/h/19981116/121507.html, Nov. 16, 1998.

Eggers et al. "Simultaneous Multithreading: A Platform for Next-Generation Processors." Sep. 1998, pp. 12-19, IEEE Micro.

Michael Slater. "Rise Joins x86 Fray with mP6." Microprocessor Report. http://www.mdronline.com/mpr/h/19981116/121501/html. Nov. 16, 1998.

Becker et al. The PowerPC 601 Microprocessor, Oct. 1993. pp. 54-68. IEEE Micro.

*The PowerPC Architecture: A Specificaiton for a New Family of RISC Processors*. Second Edition, Morgan Kaufmann. San Francisco. pp. 70-72. (May 1994).

*MC68020 32-Bit Microprocessor User's Manual*. Third Edition. Prentice Hall, New Jersey. pp. 3-125, 3-126, and 3-127 (1989).

M.J. Potel, "Real-Time Playback in Animation Systems." Proceedings of the 4th Annual Conference on Computer Graphis and Interactive Techniques, San Jose, CA. pp. 72-77 (1977).

*ARM Archictecture Reference Manual*. Prentice Hall. pp. 3-41, 3-42, 3-43, 3-67, 3-68 (1996).

*ESA/390 Principles of Operation*. IBM Library Server, Table of Contents and Para.7.5.31 and 7.5.70 (1993). (available at http://publibz.boulder.ibm.com/cgi-bin/bookmgr_OS390/BOOK/DZ9AR001/CCONTENTS).

*MC88110 Second Generation RISC Microprocessor User's Manual*. Motorola, Inc., pp. 10-66, 10-67 and 10-71 (1991).

Diefendorff, Keith et al. "Organization of the Motorola 88110 Superscalar RISC Microprocessor." IEEE Micro. vol. 12, No. 2, pp. 40-63 (1992).

Kane, Gerry. *PA-RISC 2.0 Architecture*. Prentice Hall, New Jersey. pp. 7-106 and 7-107 (1996).

Diefendorff, Keith et al. "AltiVec Extension to PowerPC Accelerates Media Processing." *IEEE Micro*. vol. 20, No. 2, pp. 85-95 (Mar.-Apr. 2000).

Gwennap, Linley. "Digital 21264 Sets New Standard." *Microprocessor Report*. vol. 20, No. 14. 11 Pages (Oct. 28, 1999).

Diefendorff, Keith. "Power4 Focuses on Memory Bandwidth." *Microprocessor Report*. vol. 13, No. 13, 13 pages (Oct. 6, 1999).

Diefendorff, Keith. "K7 Challenges Intel." *Microprocessor Report*. vol. 12, No. 14, 7 pages (Oct. 26, 1998).

* cited by examiner

FETCH AND DISPATCH DISASSOCIATION APPARATUS FOR MULTISTREAMING PROCESSORS

CROSS REFERENCE TO RELATED APPLICATION

This application is a continuation of U.S. application Ser. No. 11/539,322, filed Oct. 6, 2006, which is a continuation of U.S. application Ser. No. 09/706,154, filed Nov. 3, 2000 (now U.S. Pat. No. 7,139,898), all of which are incorporated by reference herein in their entirety.

BACKGROUND OF THE INVENTION

1. Field of the Invention

The present invention is in the field of digital processing and pertains more particularly to apparatus and methods for fetching and dispatching instructions in dynamic multistreaming processors.

2. Background

Conventional pipelined single-stream processors incorporate fetch and dispatch pipeline stages, as is true of most conventional processors. In such processors, in the fetch stage, one or more instructions are read from an instruction cache and in the dispatch stage, one or more instructions are sent to execution units (EUs) to execute. These stages may be separated by one or more other stages, for example a decode stage. In such a processor the fetch and dispatch stages are coupled together such that the fetch stage generally fetches from the instruction stream in every cycle.

In multistreaming processors known to the present inventors, multiple instruction streams are provided, each having access to the execution units. Multiple fetch stages may be provided, one for each instruction stream, although one dispatch stage is employed. Thus, the fetch and dispatch stages are coupled to one another as in other conventional processors, and each instruction stream generally fetches instructions in each cycle. That is, if there are five instruction streams, each of the five fetches in each cycle, and there needs to be a port to the instruction cache for each stream, or a separate cache for each stream.

In a multistreaming processor multiple instruction streams share a common set of resources, for example execution units and/or access to memory resources. In such a processor, for example, there may be M instruction streams that share Q execution units in any given cycle. This means that a set of up to Q instructions is chosen from the M instruction streams to be delivered to the execution units in each cycle. In the following cycle a different set of up to Q instructions is chosen, and so forth. More than one instruction may be chosen from the same instruction stream, up to a maximum P, given that there are no dependencies between the instructions.

It is desirable in multistreaming processors to maximize the number of instructions executed in each cycle. This means that the set of up to Q instructions that is chosen in each cycle should be as close to Q as possible. Reasons that there may not be Q instructions available include flow dependencies, stalls due to memory operations, stalls due to branches, and instruction fetch latency.

What is clearly needed in the art is an apparatus and method to de-couple dispatch operations from fetch operations. The present invention, in several embodiments described in enabling detail below, provides a unique solution.

SUMMARY OF THE INVENTION

In a preferred embodiment of the present invention a pipelined multistreaming processor is provided, comprising an instruction source, a plurality of streams fetching instructions from the instruction source, a dispatch stage for selecting and dispatching instructions to a set of execution units, a set of instruction queues having one queue associated with each stream in the plurality of streams, and located in the pipeline between the instruction source and the dispatch stage, and a select system for selecting streams in each cycle to fetch instructions from the instruction source. The processor is characterized in that the number of streams selected for which to fetch instructions in each cycle is fewer than the number of streams in the plurality of streams.

In some embodiments the number of streams in the plurality of streams is eight, and the number of streams selected for which to fetch instructions in each cycle is two. Also in some embodiments the select system monitors a set of fetch program counters (FPC) having one FPC associated with each stream, and directs fetching of instructions beginning at addresses according to the program counters. In still other embodiments each stream selected to fetch is directed to fetch eight instructions from the instruction cache.

In some embodiments there is a set of execution units to which the dispatch stage dispatches instructions. In some embodiments the set of execution units comprises eight Arithmetic-Logic Units (ALS), and two memory units.

In another aspect of the invention, in a pipelined multistreaming processor having an instruction queue, a method for decoupling fetching from a dispatch stage is provided, comprising the steps of (a) placing a set of instruction queues, one for each stream, in the pipeline between the instruction queue and the dispatch stage; and (b) selecting one or more streams, fewer than the number of streams in the multistreaming processor, for which to fetch instructions in each cycle from an instruction source.

In some embodiments of the method the number of streams in the plurality of streams is eight, and the number of streams selected for which to fetch instructions in each cycle is two. In some embodiments the select system monitors a set of fetch program counters (FPC) having one FPC associated with each stream, and directs fetching of instructions beginning at addresses according to the program counters. In other embodiments each stream selected to fetch is directed to fetch eight instructions from the instruction source. In preferred embodiments, also, the dispatch stage dispatches instructions to a set of execution units, which may comprise eight Arithmetic-Logic Units (ALS), and two memory units.

In embodiments of the present invention, described in enabling detail below, for the first time apparatus and methods are provided for a decoupling fetch and dispatch in processors, and particularly in multistreaming processors.

DETAILED DESCRIPTION OF EMBODIMENTS OF THE INVENTION

Figure 1:
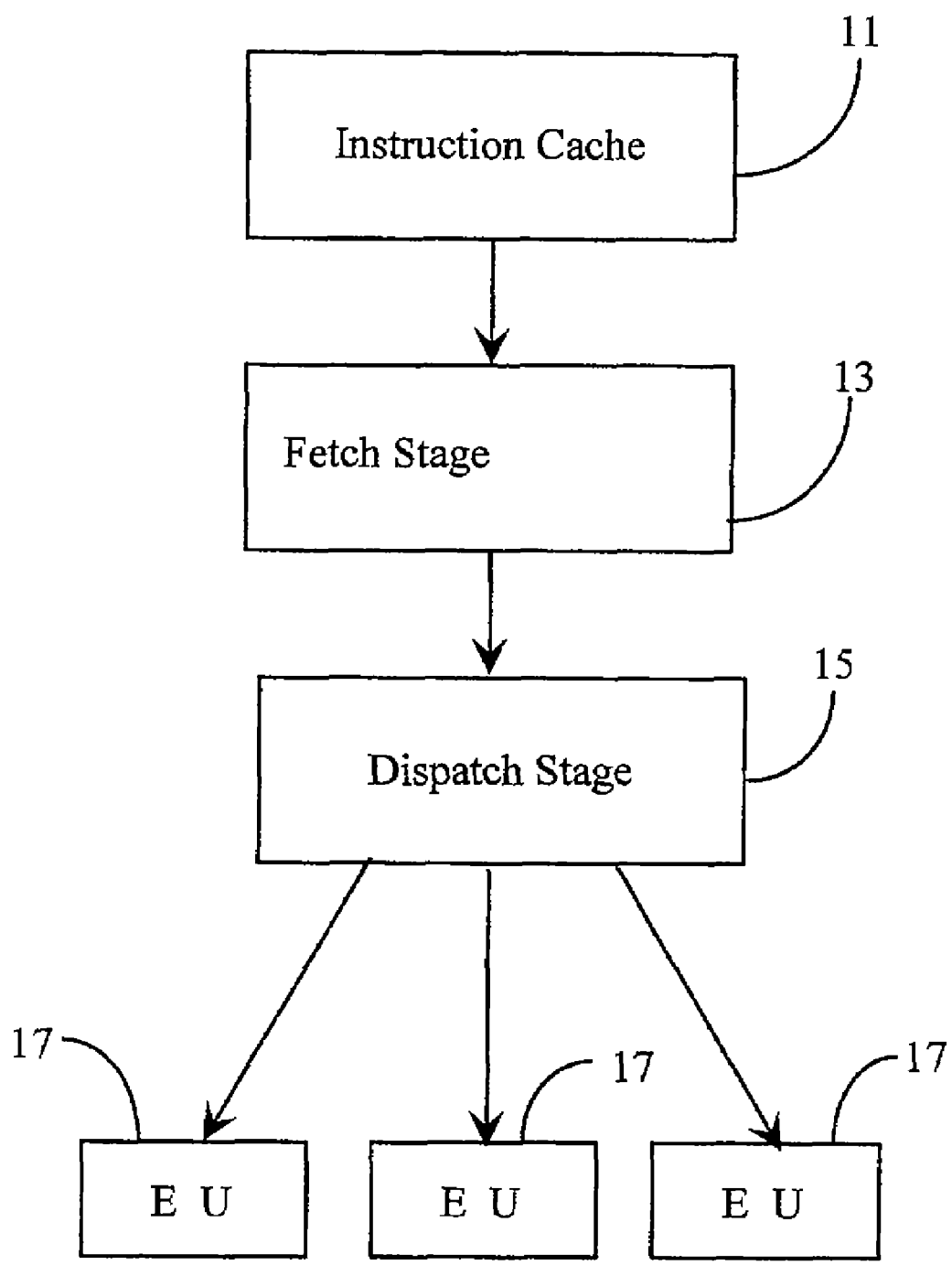
FIG. 1 is a block diagram depicting a pipelined structure for a processor in the prior art.

FIG. 1 is a block diagram depicting a pipelined structure for a processor in the prior art. In this prior art structure there is an instruction cache 11, wherein instructions await selection for execution, a fetch stage 13 which selects and fetches instruction into the pipeline, and a dispatch stage 15 which dispatches instructions to execution units (EUs) 17. In many conventional pipelined structures there are additional stages other than the exemplary stages illustrated here.

In the simple architecture illustrated in FIG. 1 everything works in lockstep. In each cycle an instruction is fetched and another previously fetched instruction is dispatched to one of the execution units.

Figure 2:
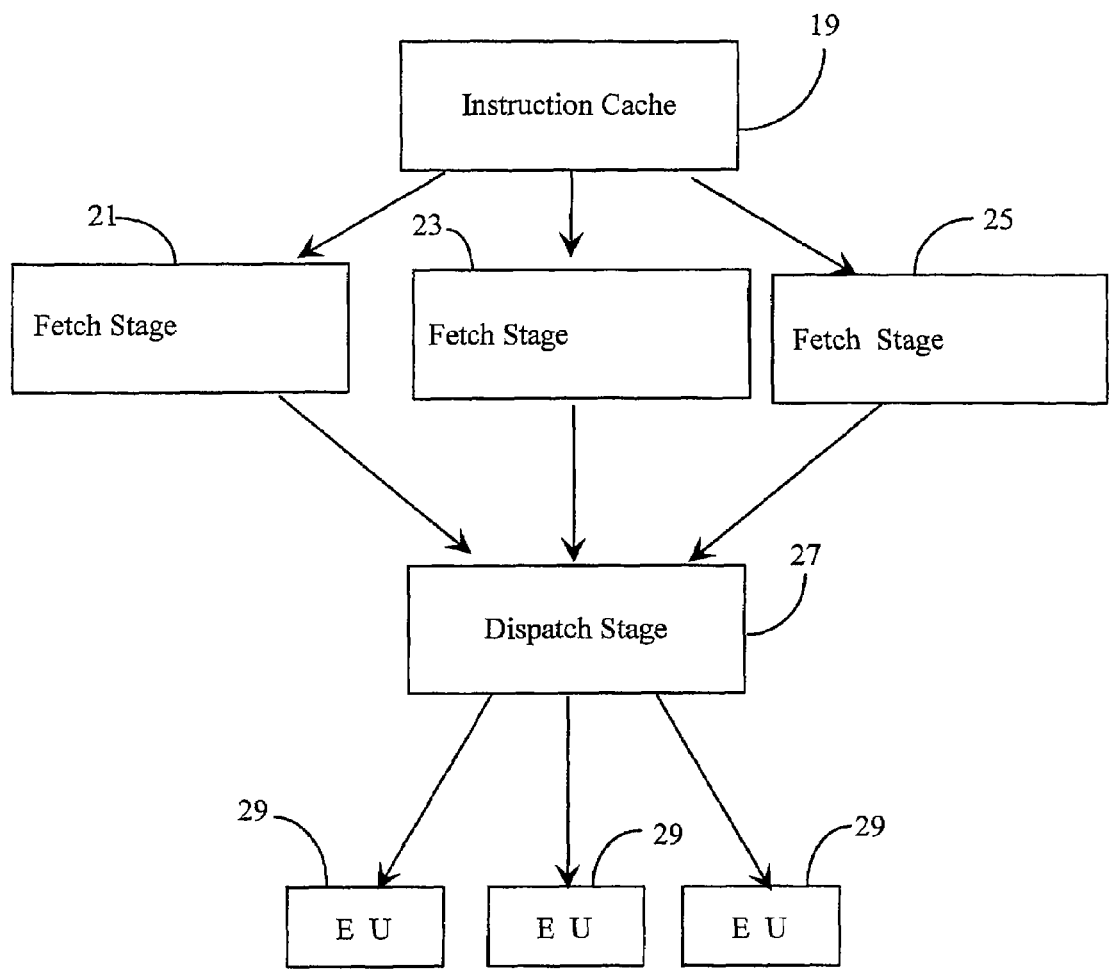
FIG. 2 is a block diagram depicting a pipelined structure for a multistreaming processor known to the present inventors.

FIG. 2 is a block diagram depicting a pipelined structure for a multistreaming processor known to the present inventors, wherein a single instruction cache 19 has ports for three separate streams, and a fetch is made per cycle by each of three fetch stages 21, 23, and 25 (one for each stream). In this particular case a single dispatch stage 27 selects instructions from a pool fed by the three streams and dispatches those instructions to one or another of three execution units 29. In this architecture the fetch and dispatch units are still directly coupled. It should be noted that the architecture of FIG. 2, while prior to the present invention, is not necessarily in the public domain, as it is an as-yet proprietary architecture known to the present inventors. In another example, there may be separate caches for separate streams, but this does not provide the desired de-coupling.

Figure 3:
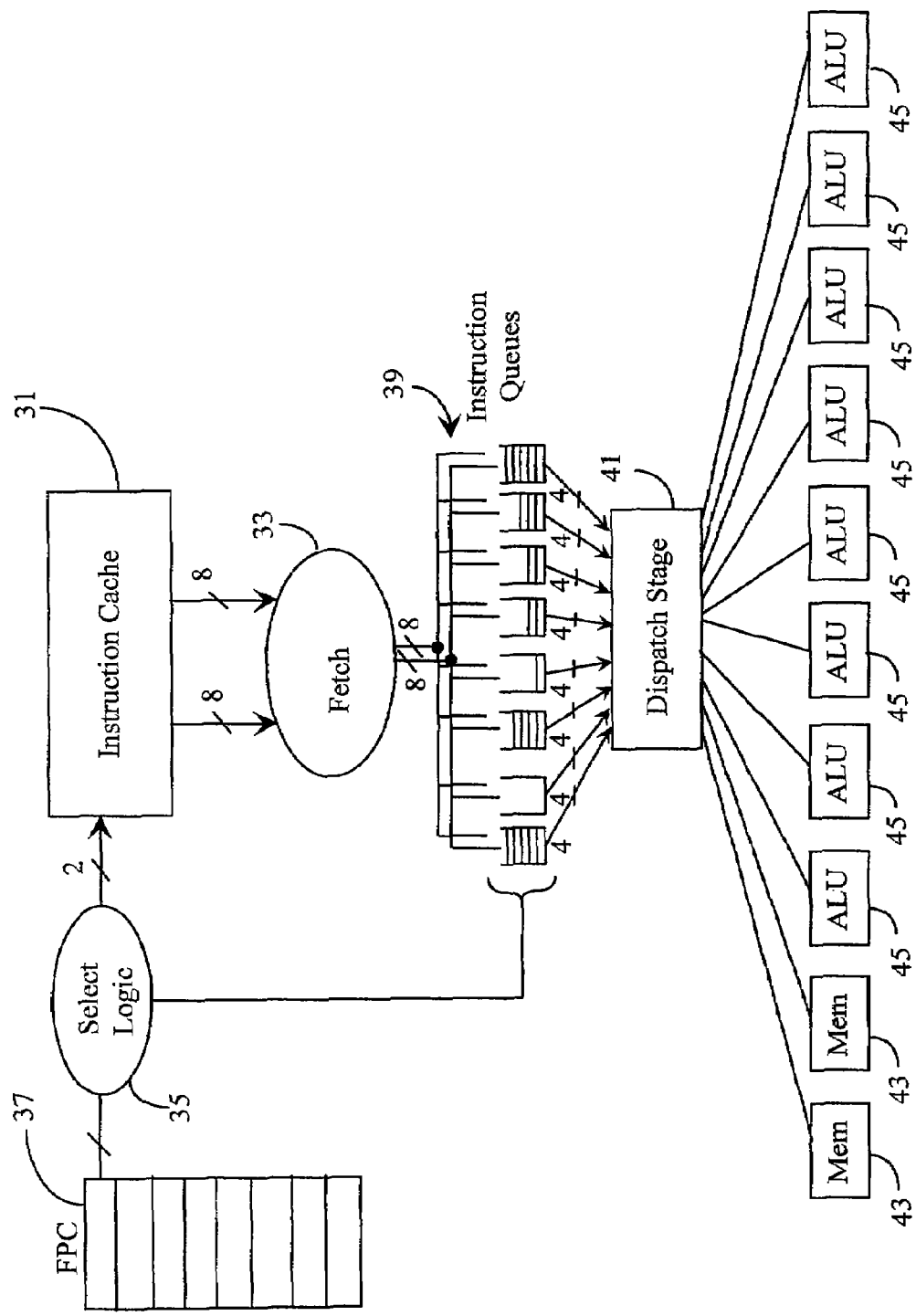
FIG. 3 is a block diagram for a pipelines architecture for a multistreaming processor according to an embodiment of the present invention.

FIG. 3 is a block diagram depicting an architecture for a dynamic multistreaming (DMS) processor according to an embodiment of the present invention. In this DMS processor there are eight streams and ten functional units. Instruction cache 31 in this embodiment has two ports for providing instructions to fetch stage 33. Eight instructions may be fetched each cycle for each port, so 16 instructions may be fetched per cycle.

In a preferred embodiment of the present invention instruction queues 39 are provided, which effectively decouple fetch and dispatch stages in the pipeline. There are in this embodiment eight instruction queues, one for each stream. In the example of FIG. 3 the instruction queues are shown in a manner to illustrate that each queue may have a different number of instructions ready for transfer to a dispatch stage 41.

Referring again to instruction cache 31 and the two ports to fetch stage 33, it was described above that eight instructions may be fetched to stage 33 via each port. Typically the eight instructions for one port are eight instructions from a single thread for a single stream. For example, the eight instructions fetched by one port in a particular cycle will typically be sequential instructions for a thread associated with one stream.

Determination of the two threads associated with two streams to be accessed in each cycle is made by selection logic 35. Logic 35 monitors a set of fetch program counters 37, which maintain a program counter for each stream, indicating at what address to find the next instruction for that stream. Select logic 35 also monitors the state of each queue in set 39 of instruction queues. Based at least in part on the state of instruction queues 39 select logic 35 determines the two threads from which to fetch instructions in a particular cycle. For example, if the instruction queue in set 39 for a stream is full, the probability of utilizing eight additional instructions into the pipeline from the thread associated with that stream is low. Conversely, if the instruction queue in set 39 for a stream is empty, the probability of utilizing eight additional instructions into the pipeline from the thread associated with that stream is high.

In this embodiment, in each cycle, four instructions are made available to dispatch stage 41 from each instruction queue. In practice, dispatch logic is provided for selecting from which queues to dispatch instructions. The dispatch logic has knowledge of many parameters, typically including priorities, instruction dependencies, and the like, and is also aware of the number of instructions in each queue.

As described above, there are in this preferred embodiment ten execution units, which include two memory units 43 and eight arithmetic logic units (ALUs) 45. Thus, in each cycle up to ten instructions may be dispatched to execution units.

In the system depicted by FIG. 3, the unique and novel set of instruction queues 39 provides decoupling of dispatch from fetch in the pipeline. The dispatch stage now has a larger pool of instructions from which to select to dispatch to execution units, and the efficiency of dispatch is improved. That is the number of instructions that may be dispatched per cycle is maximized. This structure and operation allows a large number of streams of a DMS processor to execute instructions continually while permitting the fetch mechanism to fetch from a smaller number of streams in each cycle. Fetching from a smaller number of streams, in this case two, in each cycle is important, because the hardware and logic necessary to provide additional ports into the instruction cache is significant. As an added benefit, unified access to a single cache is provided.

Thus the instruction queue in the preferred embodiment allows fetched instructions to be buffered after fetch and before dispatch. The instruction queue read mechanism allows the head of the queue to be presented to dispatch in each cycle, allowing a variable number of instructions to be dispatched from each stream in each cycle. With the instruction queue, one can take advantage of instruction stream locality, while maximizing the efficiency of the fetch mechanism in the presence of stalls and branches. By providing a fetch mechanism that can support up to eight instructions from two streams, one can keep the instruction queues full while not having to replicate the fetch bandwidth across all streams.

The skilled artisan will recognize that there are a number of alterations that might be made in embodiments of the invention described above without departing from the spirit and scope of the invention. For example, the number of instruction queues may vary, the number of ports into the instruction cache may vary, the fetch logic may be implemented in a variety of ways, and the dispatch logic may be implemented in a variety of ways, among other changes that may be made within the spirit and scope of the invention. For these and other reasons the invention should be afforded the broadest scope, and should be limited only by the claims that follow.

What is claimed is:

1. A dynamic multistreaming processor, comprising:
    a plurality of instruction queues, each instruction queue corresponding to an instruction stream;
    a fetch stage configured to fetch at least one instruction from an instruction source and store the fetched instructions in a selected one of the plurality of instruction queues;
    a plurality of execution units;
    a dispatch stage configured to select at least one instruction from one of the plurality of instruction queues and to dispatch the selected at least one instruction to one of the plurality of execution units;

a queue counter, associated with each instruction queue, configured to indicate a number of instructions in each instruction queue and to indicate the capacity of each instruction queue to accept additional instructions from the fetch stage; and a fetch program counter, associated with each instruction queue, configured to indicate an address from which to obtain instructions when the associated instruction queue indicates capacity to accept additional instructions.

2. The dynamic multistreaming processor of claim 1, wherein each of said instruction queues is associated with a thread.

3. The dynamic multistreaming processor of claim 2, wherein the dispatch stage comprises logic for determining thread priorities and instruction dependencies.

4. The dynamic multistreaming processor of claim 1, wherein the fetch stage is configured to fetch a sequential plurality of instructions from an instruction source and store the fetched instructions in at least one of the plurality of instruction queues.

5. The dynamic multistreaming processor of claim 1, further comprising:

a fetch stage configured to transfer instructions from an instruction source to a selected one of the plurality of instruction queues wherein the number of fetched instructions is dependent upon the number of instructions in the selected one of the plurality of instruction queue.

6. The dynamic multistreaming processor of claim 1, further comprising:

an instruction cache; and a fetch stage configured to fetch at least one instruction from the instruction cache to a selected one of the plurality of instruction queues.

7. A dynamic multistreaming processor, comprising:

a plurality of instruction queues, each instruction queue corresponding to an instruction stream;

a plurality of execution units;

a dispatch stage configured to select at least one instruction from one of the plurality of instruction queues and configured to dispatch the selected at least one instruction to a corresponding one of the plurality of execution units;

a plurality of fetch program counters, one associated with each of the plurality of instruction queues, configured to indicate a next instruction address from which to obtain at least one instruction; and a fetch stage configured to fetch the at least one instruction to a selected one of the instruction queues based at least in part on the plurality of fetch program counters.

8. The dynamic multistreaming processor of claim 7, wherein each of said plurality of instruction queues is associated with a thread.

9. The dynamic multistreaming processor of claim 7, wherein the dispatch stage comprises logic for determining thread priorities and instruction dependencies.

10. The dynamic multistreaming processor of claim 7, wherein the fetch stage is configured to fetch and store a number of instructions in a selected instruction queue at a rate that is independent from the rate that the dispatch stage is configured to dispatch instructions from the instruction queues.

11. The dynamic multistreaming processor of claim 7, further comprising:

an instruction source coupled to the fetch stage.

12. A dynamic multistreaming processor, comprising:

a plurality of instruction queues, each instruction queue corresponding to an instruction stream;

a fetch stage configured to fetch at least one instruction from an instruction source and store the fetched instructions in a selected one of the instruction queues;

a counter, associated with each instruction queue, configured to indicate a number of instructions in each instruction queue and to indicate the capacity of each instruction queue to accept additional instructions a second counter, associated with each instruction queue, configured to indicate a next instruction address in the instruction source from which to obtain at least one instruction when the associated instruction queue indicates capacity to accept additional instructions from the fetch stage;

a plurality of execution units; and a dispatch stage configured to select at least one instruction from one of the instruction queues and to dispatch the selected at least one instruction to one of the execution units wherein the number of instructions dispatched by the dispatch stage to the execution units is different than the number of fetched instructions.

13. The dynamic multistreaming processor of claim 12, further comprising:

logic configured to determine how many instructions from a selected instruction queue should be dispatched to the execution units.

14. The dynamic multistreaming processor of claim 12, wherein the logic further comprises logic configured to determine dependencies between instructions.

15. The dynamic multistreaming processor of claim 12, wherein the fetch stage is configured to fetch a sequential plurality of instructions from the instruction source and store the fetched instructions in at least one of the instruction queues.

16. The dynamic multistreaming processor of claim 15, wherein the instruction source comprises a single instruction cache.

* * * * *